Aug. 6, 1946.  E. L. KENT  2,405,430
APPARATUS FOR ANALYZING ROTATIONAL UNBALANCES
Filed March 25, 1943  2 Sheets-Sheet 1
*Fig. 1*
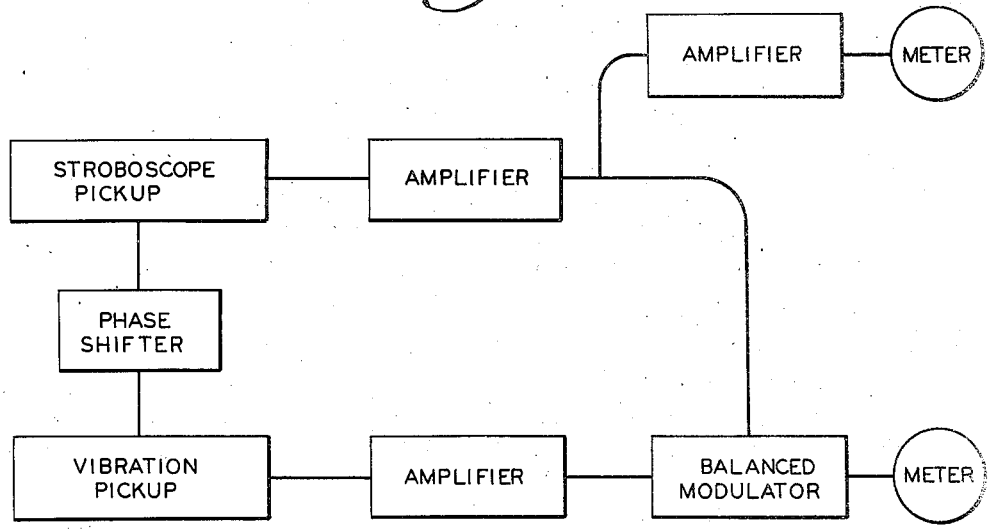
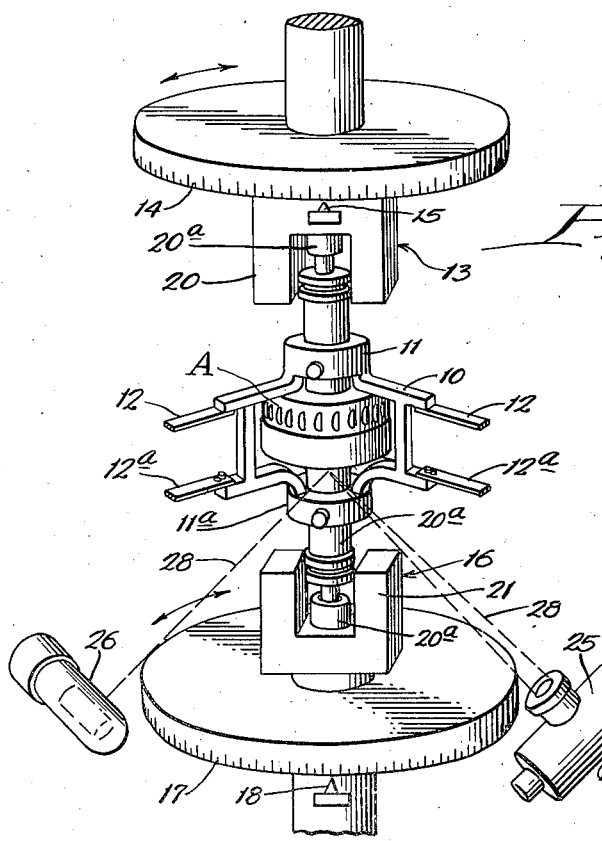
*Fig. 2*
Inventor:
Earle L. Kent,
By Dawson, Ooms & Borth
Attorneys.

Aug. 6, 1946.  E. L. KENT  2,405,430
APPARATUS FOR ANALYZING ROTATIONAL UNBALANCES
Filed March 25, 1943  2 Sheets-Sheet 2

Inventor:
Earle L. Kent,
By Dawson, Ooms & Booth,
Attorneys.

Patented Aug. 6, 1946

2,405,430

UNITED STATES PATENT OFFICE 2,405,430

APPARATUS FOR ANALYZING ROTATIONAL UNBALANCES

Earle L. Kent, Elkhart, Ind., assignor to C. G. Conn, Ltd., Elkhart, Ind., a corporation of Indiana Application March 25, 1943, Serial No. 480,500

6 Claims. (Cl. 73—66)

This invention relates to apparatus for analyzing unbalances in rotating bodies.

In machinery and instruments where there are parts which rotate at substantial speeds even a slight unbalance tends to set up vibrations which not only cause wear and noise but frequently seriously disturb the operation of the equipment. In instruments such as gyroscopes for example, it is essential that unbalances be eliminated. Since the unbalances are not noticed until substantial speeds are reached, it has been very difficult to effectively locate them so that suitable adjustments can be made.

It is one of the objects of the invention to provide apparatus for quickly and accurately analyzing the unbalances in rotating bodies and to provide apparatus which is especially effective for conducting such analysis.

Another and more particular object of the invention is to provide means for analyzing rotational unbalances which utilizes a function of the product of a voltage set up on the one hand according to the rotation of the body and a voltage set up on the other hand by the action of the unbalance.

Still another object is to provide means for analyzing rotational unbalances which will give an indication not only of the amplitude or extent of the unbalance, but its location in terms of angular distance from some established position on the rotating body being tested.

A further object is to provide means for analyzing rotational unbalances which will give a sharp and accurate indication which is not dependent on maintaining the rotating body at a constant speed of rotation.

Other objects and advantages will appear from the following description when read in connection with the accompanying drawings, in which—

Figure 1 is a block diagram showing in simple form a general arrangement of apparatus embodying the invention;

Figure 2 is a perspective view of the pickup mechanism shown in connection with a gyroscope rotor under test.

Figure 3:
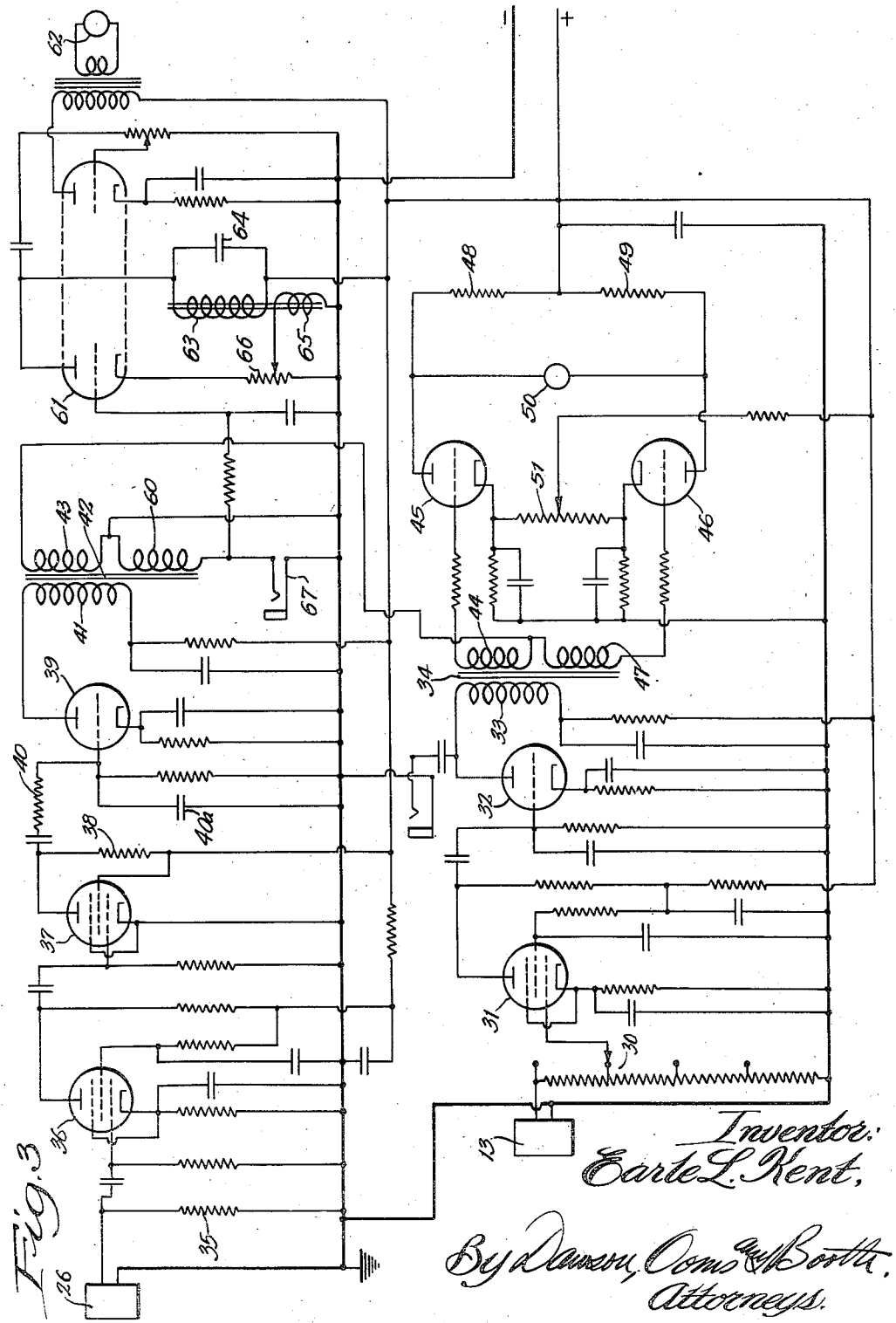
Figure 3 is a circuit diagram of this embodiment of the invention.

Referring first to Figure 1, it will be seen that the apparatus includes a vibration pickup. This device develops an electrical wave which corresponds in frequency to the speed of vibration of the rotating body, and which has a phase which depends on the adjustment of the device. Following the diagram to the right we see that the wave so generated is amplified and impressed on the balanced modulator.

In the upper part of the diagram of Figure 1 is shown the stroboscopic pickup. This device develops an electrical wave which corresponds in frequency and phase with the movement of a point on the rotating body. Following the diagram to the right, we see that the electrical wave or variation so produced is amplified and impressed on the balanced modulator. According to one feature of the invention the amplifier includes a voltage limiter so that its voltage output which is impressed on the modulator will be constant regardless of variations of speed of the body. In place of the stroboscope pickup, any other type of device could be employed which would develop a wave having a frequency and phase corresponding with the rotational movement of some point on the rotating body.

The modulator is balanced and arranged so that the signal from the vibration source by itself has no effect on the meter in the modulator output, but when the signal from the stroboscopic source is combined with the signal from the vibration source, the meter gives an indication which is a function of the magnitude and location of the unbalance causing the vibration.

More accurate indication of the location is had by use of the phase shifter shown on the diagram between the stroboscopic pickup and the vibration pickup. This phase shifter may be operated to shift the phase position of the electrical wave generated by the vibration pickup to the point where the meter reading is either zero or a maximum. In this circuit the meter reading is proportional to the cosine of the angle between the phase positions of the two waves being combined. At the condition of zero reading the indication is that the angle between the phases is 90 degrees and at the condition of maximum reading the indication is that the angle between the phase positions is zero or 180 degrees. With this orientation of the phase positions developed by the two pickups the degrees to which the vibration component was shifted can then be availed of to locate the angular position of the unbalance. An equivalent result can be accomplished by holding the vibration pickup device steady and altering the stroboscopic device to bring the respective wave components into orientation, noting the angular change necessary to produce this condition.

The electrical wave developed by means of the stroboscopic device may be suitably amplified and impressed on a meter for indicating at the same time the speed at which the rotor is rotating. This indication may be regarded as optional, and can be used when desired.

In Figure 2 is illustrated a pickup arrangement for analyzing the unbalance in an air driven gyroscope rotor A. The rotor A is mounted in the frame or spider 10 by means of the bearings 11 and 11a the spider 10 being supported by upper and lower sets of springs 12 and 12a. The springs 12 and 12a may be alternately tightened so that the rotor is first supported by its upper bearing and then by its lower bearing for checking its unbalance at both ends.

A magnetic pickup 13 includes the U-shaped permanent magnets 20 which provide a magnetic field about the upper portion of the bearings and annular coils 20a into which pins on the ends of the bearings extend, and the electrical response produced by this device is governed by the lateral movement of the shaft. When the rotor is unbalanced the heavier side will swing outward upon rotation and thus vibrate the bearings in the magnetic field completing one cycle as the rotor completes one revolution. The magnitude of the signal wave developed in the coil 20a at any instant will be governed by the movement of the heavier side with respect to the direction of the magnetic field produced by the magnet 20. In other words the vibration pickup picks up and translates into an electrical wave that component of the vibrational movement which is parallel to the magnetic field. Thus the electrical response will have the same frequency as the frequency of rotation, and its phase will correspond with the phase of the point of unbalance as this point proceeds in rotation.

The magnet 20 may be turned about its vertical axis to shift the phase of the electrical wave and is provided with a dial 14 which is calibrated in degrees. A fixed pointer 15 may serve to indicate on dial 14 the extent to which the dial is turned from some initial or base position.

As shown in Figure 2, there is provided also a lower magnetic pickup 16 which includes a permanent magnet 21 which provides a magnetic field about the lower end of the lower bearing. This device is sensitive to vibration of that portion of the shaft across the magnetic field and is provided with a calibrated dial 17 on which the pointer 18 may indicate the angle to which it has been turned from a base position.

The stroboscopic pickup device 27 as illustrated in Figure 2 includes a light source 25 which is arranged to project a beam of light 28 on the rotor A. At its section where the light beam is received the rotor is provided with a varying light pattern. Conveniently half of the rotor at this section may be light and the remaining half dark. For example, half may be polished brass and the other half unpolished or black, or if desired, only a spot of light reflecting surface on the rotor may be used. Each time the rotor reaches the angular position where the light from the source 25, striking the light or polished portion of the rotor, is reflected onto the photo tube 26, a pulse of electrical energy is begun. Thus the electrical wave initiated by the photo tube will correspond in frequency and phase with the rotational movement of a point on the rotor.

Preferably, the vibration pickup device 13 is so calibrated that at its zero setting the wave generated because of an unbalance at the same angular position as the center of the light reflecting surface on the rotor will give a signal of the same phase as that developed by the stroboscopic device. With this arrangement the dial 14 will, after proper operation of the apparatus, indicate directly the position of the unbalance relative to the light reflecting surface.

Referring now to Figure 3, the wave generated by the magnetic pickup device 13 is impressed through the potentiometer 30 on the grid of tube 31 which is a conventional electronic amplifier. The output of tube 31 is fed to the tube 32 where the wave energy is again amplified. The tube 32 is transformer coupled to the modulator stage, the output of this tube being connected to the primary winding 33 of the transformer 34.

The wave generated by the stroboscopic pickup device 26 is impressed across the resistor 35 and is so impressed on the grid of a conventional amplifier tube 36. Amplifier 36 is coupled to a tube 37 which operates as a clipper tube to limit the magnitude of the signal to a definite value regardless of the magnitude of the signal across resistor 35, provided this signal across resistor 35 exceeds a predetermined level sufficient to drive the grid of the tube past cut off. Thus the voltage in this circuit will be constant regardless of speed variations and speed variations alone will not affect the indication.

The wave shape of the voltage across the resistor 38 in the plate circuit of tube 37 is substantially square and may be used in this shape if it is desired for the apparatus to measure to some extent the harmonics of the fundamental wave applied at the vibration pickup device 13. But if it is desired to determine the fundamental wave alone, some means may be provided for altering this wave form. In the circuit shown, a high frequency attenuator is inserted between tubes 37 and 39 (see resistor 40 and condenser 40a). Instead of such attenuator a low pass filter may be inserted at this point to serve the same function.

From the attenuator the signal is impressed on an amplifier tube 39 which amplifies the signal and supplies it to the primary winding 41 of the coupling transformer 42. A secondary winding 43 of the transformer 42 is connected into the transformer 34 and the photo cell voltage is thus impressed on the modulator.

The modulator includes the two tubes 45 and 46 which are connected in push-pull relation, the windings 44 and 47 of the transformer 34 are connected between the grids of the respective tubes, and their plates are connected to a positive source through resistors 48 and 49 respectively. Resistors 48 and 49 are of equal value and have equal voltage across them when the modulator is balanced. A meter 50 such as a milliammeter is connected between the plates of the two tubes to indicate any difference in the voltages across the plate circuits. A modulator circuit of the type shown is more particularly illustrated and described in the patent to Peterson No. 1,586,533.

The potentiometer 51 provides a way of balancing the modulator so that regardless of whether a signal is received from the vibration pickup, in the absence of any signal from the stroboscopic source, the output of each of tubes 45 and 46 is the same and the reading on the meter 50 will be zero.

The signal from the photocell source is imposed in the transformer 34 in such a manner that this signal adds to the voltage applied to the grid of one of tubes 45 and 46 and subtracts from the voltage applied to the other of these tubes. Thus this signal applied in the modulator has the effect of unbalancing the otherwise balanced condition. Meter 50 will give an indication proportional to the product of the signal from the photocell source and the signal from the vibration pickup source multiplied by the cosine of the angle representing the difference in their phases. Only the frequencies which are represented in the signal from the photo tube source will register in the indication given on the meter 50, since all other frequencies received from the vibration pickup will continue to cancel out in the modulator just the same as they would do had the photo tube signal never been impressed at the modulator.

It will be apparent that, since the indication shown on meter 50 is a function of the cosine of the angle between the phases, this reading also bears an indication as to the location of the position of unbalance on the rotating body. If the reading is zero the angle between the phases is 90 degrees either lagging or leading, and the position of unbalance can be located 90 degrees distant on the rotating body from the center of the light reflecting surface. The wave from the photocell source corresponds to a certain radius on the rotor which is fixed, and the wave from the vibration source corresponds to a diameter which includes the point of unbalance. Therefore the angle between the phases of these two waves represent the angle between these radii, or in other words, the angular distance from the center of the light reflecting surface on the rotor to the position of unbalance of the rotor.

If the meter reads a high positive value, then the angle between the phases is an angle whose cosine is large and this would mean that the angle is either very small or nearly 180°. If the meter reading is a high negative value, the angular distance from the center of the light reflecting surface may be counted in the opposite direction. Thus the meter 50 gives a reading which is indicative of the phase angle between the two signals and therefore the physical location of the unbalance. When the phase difference between the signal waves is zero or 180 degrees so that the meter reading is a maximum in one or another direction, the reading is a measure also of the extent of the unbalance, since in such case the component representing the photocell signal is constant, the cosine of the phase difference angle is one, and the only variable is the strength of the vibration signal; consequently in such case the reading of the meter is a measure of the extent of the unbalance.

However, without phase adjustment between the two signal waves, the location of the unbalance is not accurate where the angle between the phases is not zero or 90 degrees but lies somewhere intermediate of these values. This is because the indications are maximum and zero at 0° and 90° and these points can readily be determined by observation while the indeterminate indications obtained at intermediate values make an accurate location of the unbalance difficult. Also the extent of the unbalance is not accurately indicated by the meter except where the phase angle happens to be nearly zero or 180 degrees at which points the cosine is unity and a maximum meter reading is obtained. To provide better facility in this respect, I employ the phase adjusting device for adjusting either the signal from the stroboscopic source or the signal from the vibration pickup source with respect to the other. In the embodiment presently described the phase of the wave from the stroboscopic device is maintained constant and the phase of the wave obtained from the vibration pickup is shifted.

As already described in connection with the pickup 13, the permanent magnet may be turned about the axis of rotation of the body being tested, and the extent of the turning is indicated on the dial 14. This turning of the magnet changes the direction of the magnetic field and therefore shifts the phase of the electric response produced by this device. When this device is turned to bring the two wave signals into phase the meter 50 will read a maximum, and when it is turned to bring the two wave signals 90 degrees apart, the meter 50 will read zero.

Referring again to Fig. 3, there may be provided a means for indicating the speed of the rotor at the same time that information is being obtained on the unbalance. The winding 60 on transformer 42 is connected to the input of a conventional two stage amplifier tube 61 having adjustable regeneration control to adjust the sharpness of tuning. The regeneration control as shown includes a transformer whose primary 63 is connected in parallel with a condenser 64 to form a resonant circuit in the plate circuit of the first stage of tube 61. Primary 63 is coupled to a secondary 65 which is connected thru an adjustable resistance 66 to the cathode of the first stage of the tube 61. If desired a jack may be provided as shown at 67 to short circuit the winding 60 and shunt the tube 61 out of the circuit. The output of the second stage of tube 61 is transformer coupled to the meter 62 and the meter reading serves as an approximate measure of the speed of the rotor. By use of this feature the operator may keep the speed of the rotor within reasonable limits, and thus eliminate all but negligible error in the readings taken at meter 50 and on the dial 14.

In the practice of the invention employing the apparatus illustrated, the operator may set up the rotor to be tested in some arrangement such as shown in Fig. 2 with the dial 14 set at zero on the calibrated scale, and with springs 12a supporting the lower bearing 11a and the upper bearing 11 free to float. The rotor is set in motion and, assuming that the modulator has been properly balanced, the operator proceeds to determine the extent and location of the unbalance. The better practice is first to adjust the dial 14 to the point where the meter reads a maximum, and this gives the operator a measure of the extent of the unbalance. Then the dial is again turned this time to a position where the meter 50 reads zero or minimum as before explained. The dial 14 preferably is calibrated to read directly the angular distance of the unbalance from the center of the light reflecting spot on the rotor, when this condition obtains. The accuracy is somewhat greater with this practice since the cosine of the phase difference angle is changing most rapidly at 90 degrees. However, the dial 14 could be calibrated to read the desired angle directly at the condition of maximum meter reading with only slight decrease in accuracy. It may be noted that a phase difference of 270 degrees will produce a zero reading of the meter 50 as well as a phase difference of 90 degrees, but in practice this presents no difficulty, for the operator is able to distinguish between these conditions since motion of the pointer through zero in the same direction as the dial is turned represents the 90 degree difference while motion of the pointer in the opposite direction indicates the 270 degree difference.

It will be observed that while some phase shift may occur in the stroboscope channel and in the vibration channel, if similar frequencies are shifted a like amount in each channel, there will be no appreciable error in the phase readings due to the phase shift in either channel. The circuits may be designed to make this true over wide limits of operation.

If the first series of readings as just explained, be taken using the vibration pickup 13, this same procedure may be repeated using the pickup device 16 connected in the circuit instead of device 13 for delivering signal to the modulator and with the springs 12 supporting the upper bearing 11 and the bearing 11a free to float. In this way, the extent and location of unbalance at both ends of the rotor is determined.

An important advantage in the use of my improved apparatus is that a satisfactory analysis can be had without controlling within narrow limits the speed of the rotating body under test. Also it is possible to obtain a much clearer indication of the principal or fundamental unbalance because of the effect of the modulator in omitting from the indication given all those frequencies of vibration not corresponding with the frequency of the signal from the stroboscopic device.

While the invention has been specifically described in connection with the single embodiment shown, it is understood that there may be wide variations in the specific apparatus employed within the spirit of the invention.

What is claimed is:

1. A device for analyzing rotational unbalances comprising means for developing an alternating electric voltage having a frequency corresponding with the frequency of rotation of a rotating body and a phase bearing a known relation to a point on said body, means to clip the peaks of the alternating voltage to provide a series of voltage pulses of constant maximum amplitude, means for developing an alternating electric voltage having a frequency and phase corresponding with a point of unbalance on said body and an amplitude proportional to the extent of unbalance, means for combining said voltages to provide a resultant proportional to their product, and indicating means responsive to the resultant.

2. A device for analyzing unbalances in a rotating body comprising means for developing an electric voltage having a frequency and phase corresponding with an unknown point of unbalance on said body and an amplitude proportional to the extent of unbalance, means for developing an electric voltage having a frequency and phase corresponding with a known point on said body, means to limit the maximum amplitude of said last named voltage to a constant value, a modulator in which said voltages are multiplied times a function of the phase angle between them, means for shifting the phase of one of the voltages to bring them into phase, and means to measure the amplitude of the modulator output.

3. A device for analyzing unbalances in a rotating body comprising means for developing a wave having a frequency and phase corresponding with an unknown point of unbalance on said body, means for developing a wave having a frequency and phase corresponding with a known point on said body, means to limit the maximum amplitude of said last named wave to a constant value, a meter, and means sensitive to said waves for energizing said meter to an extent proportional to the product of the waves times a function of the angle between the phases of said waves.

4. A device for analyzing unbalances in a rotating body comprising means for developing a wave having a frequency and phase corresponding with an unknown point of unbalance on said body, means for developing a wave having a frequency and phase corresponding with a known point on said body, means to limit the maximum amplitude of said last named wave to a constant value, a meter, means sensitive to said waves for energizing said meter to an extent proportional to the product of the waves times a function of the angle between the phases of said waves, and means for adjusting the phase of one of said waves.

5. In apparatus for analyzing unbalances in rotating parts, means for generating two waves each having a frequency corresponding to the speed of rotation, one of said waves having a phase corresponding with a known point on the rotating part and the other having a phase corresponding with a point of unbalance, means for limiting the maximum amplitude of said one of the waves to a constant value, a modulator sensitive to both of said waves but balanced to give no signal at its output in response to said other of the two waves only, said modulator being constructed and arranged to give a signal at its output which is proportional to the cosine of the angle between said waves, and means for indicating said signal.

6. In apparatus for analyzing unbalances in a rotating body, generating means for producing a wave having a frequency and phase corresponding to the motion of a known point on the body, a limiter tube controlled by the wave to convert it to a wave having a constant maximum amplitude, generating means for developing a wave whose frequency is proportional to the speed of rotation of the body and whose amplitude is proportional to the amount of unbalance of the body, and a modulator circuit including a transformer in which the constant amplitude wave and the last named wave are combined, a pair of tubes in push-pull relationship controlled by the transformer, and a meter connected across the outputs of the tubes.

EARLE L. KENT.